United States Patent
Scholl et al.

(10) Patent No.: US 9,896,066 B2
(45) Date of Patent: Feb. 20, 2018

(54) WIPER BLADE FOR THE CLEANING OF VEHICLE WINDOWS, AND WIPER DEVICE

(71) Applicant: Valeo Wischersysteme GmbH, Bietigheim-Bissingen (DE)

(72) Inventors: Wolfgang Scholl, Gemmrigheim (DE); Siegfried Waible, Flein (DE)

(73) Assignee: Valeo Wichersysteme GmbH, Bietigheim-Bissingen (DE)

( * ) Notice: Subject to any disclaimer, the term of this patent is extended or adjusted under 35 U.S.C. 154(b) by 230 days.

(21) Appl. No.: 14/768,897

(22) PCT Filed: Feb. 28, 2014

(86) PCT No.: PCT/EP2014/054002
§ 371 (c)(1),
(2) Date: Aug. 19, 2015

(87) PCT Pub. No.: WO2014/131903
PCT Pub. Date: Sep. 4, 2014

(65) Prior Publication Data
US 2016/0001746 A1 Jan. 7, 2016

(30) Foreign Application Priority Data
Feb. 28, 2013 (DE) .......... 10 2013 102 011

(51) Int. Cl.
*B60S 1/40* (2006.01)
(52) U.S. Cl.
CPC ..... *B60S 1/4048* (2013.01); *B60S 2001/4054* (2013.01); *B60S 2001/4058* (2013.01)
(58) Field of Classification Search
CPC .... B60S 1/4038; B60S 1/4045; B60S 1/4048; B60S 2001/4058; B60S 2001/4054
(Continued)

(56) References Cited

U.S. PATENT DOCUMENTS 8,719,994 B2 * 5/2014 Thienard ............... B60S 1/3868
15/250.201
2013/0007977 A1 1/2013 Depondt

FOREIGN PATENT DOCUMENTS

DE 4128839 A1 4/1992
DE 602004007097 T2 2/2008
(Continued)

OTHER PUBLICATIONS

International Search Report in corresponding application No. PCT/EP2014/054002 dated May 14, 2014 (3 pages).
(Continued)

*Primary Examiner* — Gary Graham
(74) *Attorney, Agent, or Firm* — Osha Liang LLP

(57) ABSTRACT

A wiper blade for the cleaning of vehicle windows is disclosed. The wiper blade has a body which is connected with a wiper arm by a wiper blade adapter. The wiper blade adapter includes a first adapter element on the wiper-arm side and a second adapter element on the wiper-blade side, which are arranged pivotably with respect to one another in an axis. On the adapter element on the wiper-arm side a first holding arrangement is arranged for securing the wiper blade body in the longitudinal direction of the wiper blade with a flexible tongue, and with a detent element arranged on the flexible tongue for form-fitting arrangement in a mount of the wiper arm, and with a second holding arrangement, which secures the wiper blade on the wiper arm additionally in the longitudinal direction of the wiper blade body.

10 Claims, 2 Drawing Sheets

Figure 1:
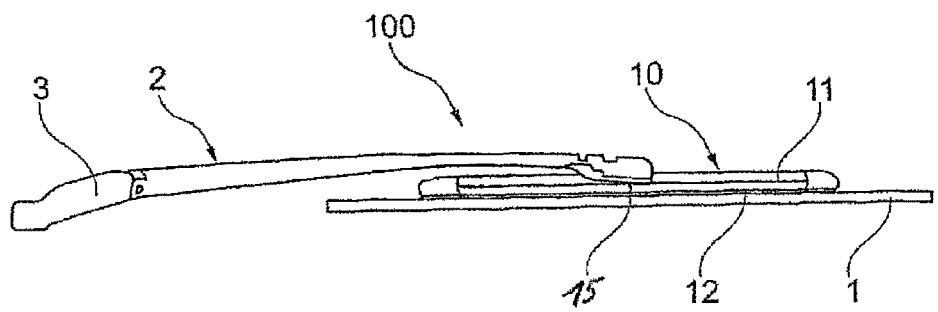

(58) Field of Classification Search
USPC .................................................... 15/250.32
See application file for complete search history.

(56) References Cited

FOREIGN PATENT DOCUMENTS

| | | | |
|---|---|---|---|
| DE | 10 2008 049 273 A1 | 4/2010 |
| DE | 10 2008 049272 A1 | 4/2010 |
| EP | 1937524 A1 | 7/2008 |
| FR | 2781741 A1 | 2/2000 |
| FR | 2 890 925 A1 | 3/2007 |
| KR | 200438836 Y1 | 3/2008 |
| WO | 2007033827 A1 | 3/2007 |

OTHER PUBLICATIONS

German Search Report issued in corresponding German application No. 10 2013 102 011.9 dated Feb. 28, 2013 (4 pages).

\* cited by examiner

WIPER BLADE FOR THE CLEANING OF VEHICLE WINDOWS, AND WIPER DEVICE

PRIOR ART

The invention relates to a wiper blade for the cleaning of vehicle windows according to the precharacterizing clause of claim 1. Furthermore, the invention relates to a wiper device, comprising a wiper blade according to the invention and a wiper arm.

A wiper blade according to the precharacterizing clause of claim 1 is known from DE 60 2004 007 097 T2. The known wiper blade has two holding arrangements which secure and hold the wiper blade on the wiper arm in the longitudinal direction of the wiper blade and in the direction of the wiper blade body thereof. The first holding arrangement comprises, for example, a resiliently arranged holding tongue with a detent element which, in the fitted position of the wiper blade to the wiper arm, engages in a form-fitting manner in a corresponding mount of the wiper arm, said mount being arranged, for example, on the upper side of the wiper arm, i.e. on the side facing away from the vehicle window. If, for example, the flexible tongue fails or breaks or the detent element is unintentionally pressed due to external circumstances into the mount of the wiper arm, although the wiper blade can move out of the original operating position thereof on the wiper arm in the longitudinal direction of the wiper arm for a distance in the removal direction, the second holding arrangement prevents the wiper blade from being completely detached from the wiper arm.

It has turned out in practice that in particular external forces caused, for example, by washing brushes in (automatic) car washes may result in an inadvertent actuation of the detent element, and therefore the second securing arrangement discussed can avoid the wiper blade being lost, in particular while under way. However, it is disadvantageous here that, nevertheless, the wiper blade may move in the removal direction on the wiper arm, which has an adverse effect on the function of the wiper blade and, in practice, for example when a windscreen wiper is actuated for the first time after passing through a car wash, may lead to a safety risk during rapid motorway travel.

SUMMARY OF THE INVENTION

Starting from the illustrated prior art, the invention is based on the object of developing a wiper blade for the cleaning of vehicle windows according to the precharacterizing clause of claim 1 in such a manner that, when external forces occur on the detent element of the (first) holding arrangement, said external forces not serving for removal of the wiper blade from the wiper arm for exchange purposes, an actuation of the detent element, which otherwise results in the wiper blade being detached or movement of the wiper blade in the removal direction on the wiper arm, is reliably avoided.

This object is achieved according to the invention in the case of a wiper blade for the cleaning of vehicle windows with the features of claim 1 in that the second holding arrangement is arranged in operative connection with the first holding arrangement and is constructed such that an actuation of the first holding arrangement is enabled as a function of the pivoting angle between the two adapter elements, i.e. between the first adapter element on the wiper-arm side and the second adapter element on the wiper-blade side.

Put another way, this means that, in contrast to the prior art, in which the two holding arrangements act independently of each other, it is proposed to arrange the first holding arrangement in operative connection with the second holding arrangement in such a manner that an actuation or pressing down of the detent element, and consequently a detaching of the wiper blade from the wiper arm, is possible depending on the pivoting angle between the two adapter elements. This has the consequence that, in the operating position, the two holding arrangements simultaneously secure the wiper blade in the longitudinal direction in the wiper arm or on the wiper arm.

Advantageous developments of the wiper blade according to the invention for the cleaning of vehicle windows are listed in the dependent claims.

It is essential in practice that, in a normal operating position of the wiper blade, in which the wiper blade body thereof abuts on the vehicle window, a detaching of the wiper blade from the wiper arm (i.e. a movement in the removal direction) has to be prevented. By contrast, it is customary to pivot the wiper arm away from the vehicle window in order to exchange the wiper blade on the wiper arm. Therefore, provision is made in the invention for the second holding arrangement to be constructed such that an actuation of the first holding arrangement is only enabled starting from a pivoting angle which is greater than the pivoting angles which are present during the wiping operation, which are defined by the abutting of the wiper blade body on a vehicle window. This means that an exchange of the wiper blade, i.e. a detaching of the wiper blade from the wiper arm, is possible only when the wiper blade is pivoted into a position on the wiper arm that said wiper blade does not take up during the normal wiping operation. In this position, the second holding arrangement releases the first holding arrangement, and therefore the detent element can be pressed into the corresponding mount on the wiper arm, and the wiper blade can subsequently be pulled out of the wiper arm in the longitudinal direction. Such a solution also has the advantage that, in order to remove the wiper blade, it suffices merely to actuate the first holding arrangement, and therefore simple handling is obtained.

In a structural refinement of the second holding arrangement, it is proposed that the second holding arrangement is directly connected with the first holding arrangement and with a pivoting angle, which is within the pivoting angles during the wiping operation, on actuation of the first holding arrangement arrives into abutting contact with a counter-element, such that the actuation path of the first holding arrangement is delimited, so that the wiper blade body is secured on the wiper arm.

In a structurally preferred development of the last-mentioned alternative, it is proposed that the second holding arrangement comprises a stop element formed on the first holding arrangement, which stop element cooperates with a stop surface on the first adapter element on the wiper-arm side. A stop surface of this type can in particular constitute the upper side or geometry of the first adapter element on the wiper-arm side, which upper side or geometry is present in the case of conventional wiper blades, and therefore, in this respect, the additional cost in respect of the construction of the second holding arrangement is minimized.

In a structural development of the last-made proposal, provision is made for the stop element to be formed on the underside, facing the second adapter element on the wiper-blade side, on the flexible tongue of the first holding arrangement. A stop element of this type is constructed here in particular in the form of a stop rib.

Furthermore, it is very particularly preferred if the stop element is arranged on the side facing away from a pivot axis of the flexible tongue, preferably at least close to the region of the detent element. An arrangement of this type of the stop element in the region close to the detent element has the advantage that, in the event of a dynamic effect on the detent element of the first holding arrangement, the movement of the detent element is transmitted directly to the stop element and, in particular, no spring deflection of the detent element in the intermediate region between the stop element and the detent element, which could otherwise possibly result in the wiper blade being detached from the wiper arm, can take place.

In a structurally preferred refinement of the detent connection between the wiper blade and the wiper arm, provision is made for the detent element to be arranged on the upper side of the adapter element on the wiper-arm side facing away from the wiper blade body. As a result, the wiper blade is fastened to the wiper arm by just a single detent connection, and therefore the structural outlay and the manufacturing costs with respect to the wiper blade connection are relatively low.

Finally, the invention also comprises a wiper device which consists of a wiper blade according to the invention and a wiper arm interacting with the wiper blade according to the invention.

Figure 2:
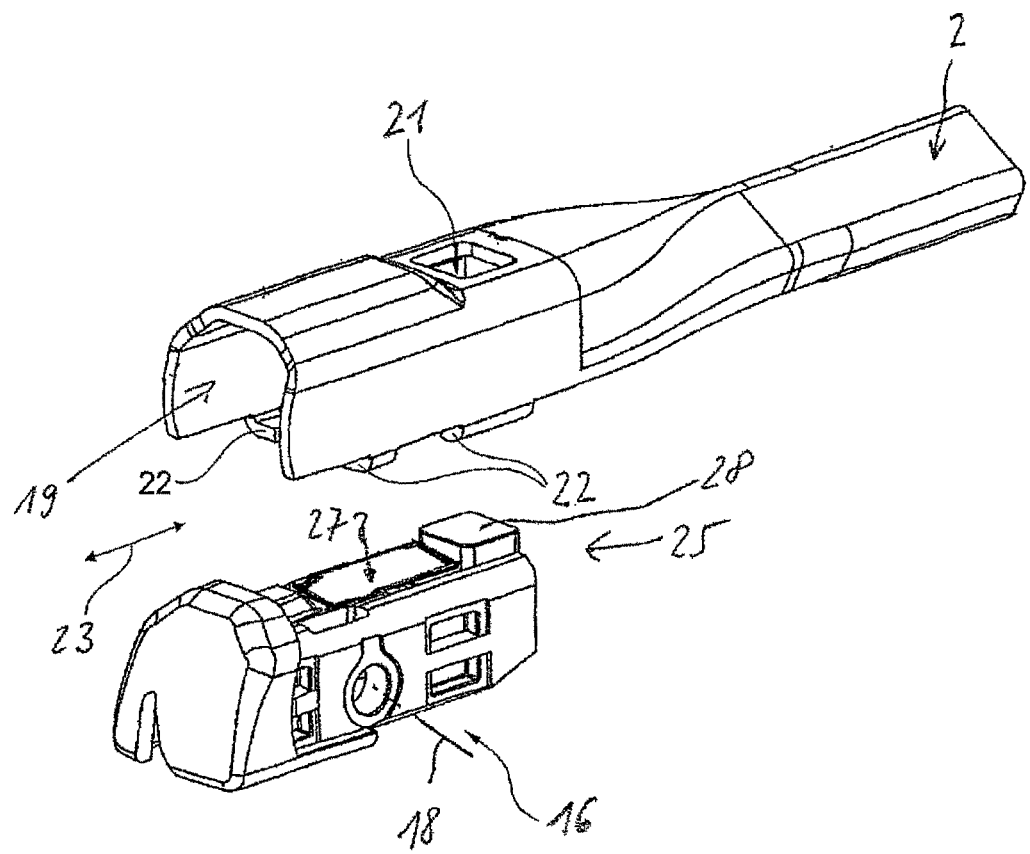

Further advantages, features and details of the invention emerge from the description below of preferred exemplary embodiments and with reference to the drawing, in which:

FIG. 1 shows a wiper device for the cleaning of a vehicle window, in a simplified side view, FIG. 2 shows the end region of a wiper arm and of an adapter element on the wiper-arm side, as used in a wiper device according to FIG. 1, in a perspective view, and

FIG. 3 to

Figure 6:
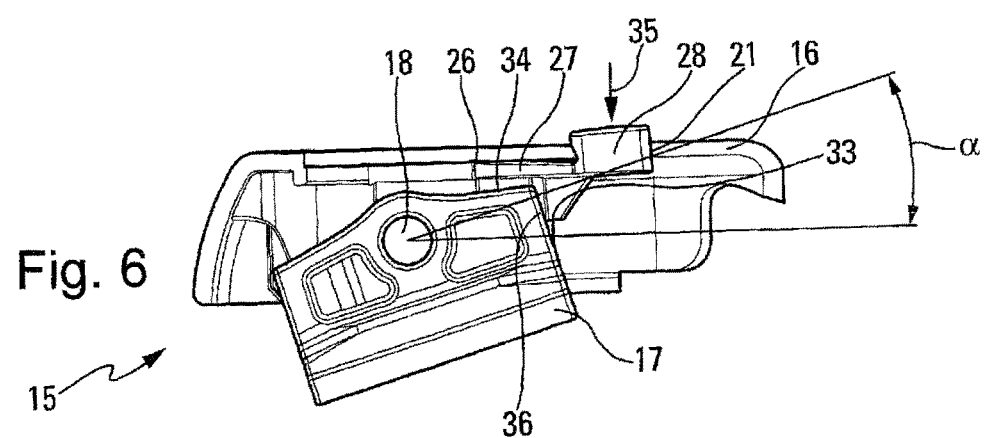

FIG. 6 each show, in longitudinal section, an adapter element fitted on a wiper arm in different positions of the adapter element on the wiper-blade side with respect to the wiper arm in order to clarify the function according to the invention of the holding arrangements according to the invention.

Identical elements or elements with the same function are provided with the same reference numbers in the figures.

FIG. 1 illustrates a wiper device 100 for the cleaning of a vehicle window 1. The wiper device 100 comprises a wiper arm 2 which is arranged pivotably in a known manner on a wiper arm joint 3. The wiper arm joint 3 is at least indirectly coupled in turn to a windscreen wiper motor for moving the wiper arm 2 to and fro. A wiper blade 10 according to the invention which has an elongate wiper blade body 11 with a wiper lip 12 for abutting on the vehicle window 1 is fastened exchangeably to the wiper arm 2. The wiper blade 10 is fastened to the wiper arm 2 via a wiper blade adapter 15 which is arranged on the wiper blade 10 and is connected to the wiper blade body 11.

From an overall view of FIGS. 2 to 6, it can be seen that the wiper blade adapter 15 consists of a first adapter element 16 on the wiper-arm side and of a second adapter element 17 on the wiper-blade side, said adapter elements being arranged pivotably with respect to each other in a pivot axis 18. The two adapter elements 16, 17 are designed as injection-moulded plastics parts and are connected to each other via a form-fitting connection. The adapter element 17 on the wiper-blade side is connected to the wiper blade body 11 in a manner which is known per se and is therefore not illustrated specifically, whereas the adapter element 16 on the wiper-arm side is connected to the wiper arm 2.

As can be seen in particular with reference to FIG. 2, the wiper arm 2, which consists of sheet metal, has a receiving region 19 for the adapter element 16, which is on the wiper-arm side, of the wiper blade adapter 15. The wiper arm 2 is of U-shape design in cross section in the receiving region 19 and, on the upper side thereof, i.e. on the side facing away from the vehicle window 1, has a rectangular or square mount 21 in the form of an aperture. On the underside of the wiper arm 2 facing away from the mount 21, a plurality of inwardly projecting holding sections 22 are arranged for guiding or fixing the wiper blade adapter 15 in a direction perpendicular to the extent of the wiper arm 12.

By means of the wiper blade adapter 15, the wiper blade 10 can be moved in the direction of the double arrow 23 into the cross section of the wiper arm 2 in order to fit the wiper blade 10 on, or to remove same from, the wiper arm 2. In order to fix the wiper blade 10 in the operating position thereof, i.e. in particular during the wiping operation, on the wiper arm 2 in the longitudinal direction of the wiper blade, the adapter element 16 on the wiper-arm side has a first holding arrangement 25 on the upper side facing away from the vehicle window 1. The first holding arrangement 25 comprises a resilient tongue 27 which is arranged resiliently in a pivot axis 26 and on that side of which facing away from the pivot axis 26 a block-shaped detent element 28 is arranged, said detent element, in the holding position of the wiper blade 10 on the wiper arm 2, engaging with a form fit in the mount 21 of the wiper arm 2 in a manner which is known per se.

During the operation of the wiper device 100, the wiper blade 10 is moved along the vehicle window 1 by the wiper arm 2. It is essential in this case that, depending on the geometry of the vehicle window 1 and on the geometry of the wiper arm 2 and of the wiper blade 10, only relatively small pivoting angles $\alpha$ are formed between the adapter element 16 on the wiper-arm side and the adapter element 17 on the wiper-blade side, as can be seen with reference to FIGS. 3 and 4. Typically, the maximum possible pivoting angle $\alpha$ between the adapter element 16 on the wiper-arm side and the adapter element 17 on the wiper-blade side during the wiping operation is, for example, $+1/-5°$, depending on the specific application and depending on the geometry of the vehicle window 1, the length of the wiper arm 2, etc., wherein an angle $\alpha$ of $0°$ is defined by the two adapter elements 16, 17 being oriented or arranged parallel to each other. In other words, this means that, at an angle $\alpha$ of $0°$, the wiper blade body 11 in the region of the adapter element 17 on the wiper-blade side and the wiper arm 2 in the receiving region 19 are oriented parallel to each other.

In addition to the first holding arrangement 25, the wiper blade 10 has a second holding arrangement 30 for securing the wiper blade 10 in the longitudinal direction thereof or in the longitudinal direction of the wiper blade body 11. As can be seen with reference to FIGS. 3 to 6, the second holding arrangement 30 comprises a stop element 31 which is formed integrally on the underside of the flexible tongue 27 and is in the form of a stop rib 32 which, starting from the connecting region on the flexible tongue 27, tapers towards the adapter element 17 on the wiper-blade side and has a planar stop surface 33 parallel to the flexible tongue 27. Furthermore, it can be seen with reference to FIGS. 3 to 6 that the stop element 31 is located in a region of the flexible tongue 27 in which the connecting region runs in the longitudinal direction between the stop element 31 and the flexible tongue 27 until below the detent element 28.

Figure 3:
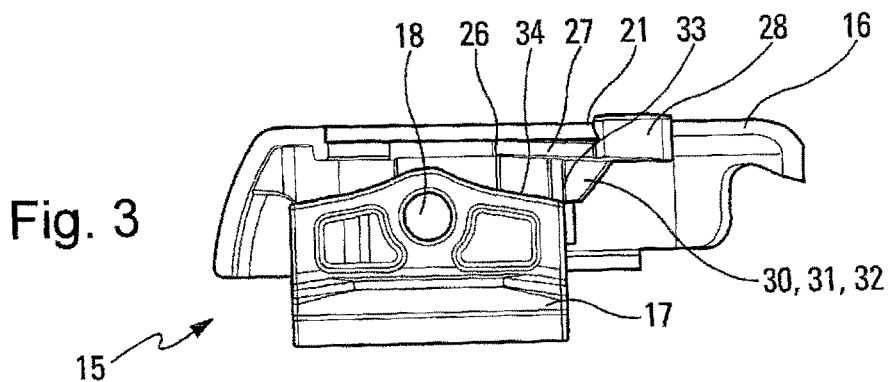

The state in which the pivoting angle α between the two adapter elements 16, 17 is approximately 0° can be seen in FIG. 3. The underside of the stop element 31 facing away from the spring element 27 interacts at the corner region with the upper side 34 of the adapter element 17 on the wiper-blade side in such a manner that the detent element 28 cannot be pressed in the direction of the arrow 35 into the mount 21 of the wiper arm 2, since the stop element 31 enters into contact with the adapter element 17 on the wiper-blade side, and the movement of the detent element 28 is limited in so far as the detent element 28 cannot be pressed into a plane below the mount 21 in the wiper arm 2. The second holding arrangement 30 therefore has the effect that the first holding arrangement 25 cannot be actuated in a required manner for removing the wiper blade 10 from the wiper arm 2.

Figure 4:
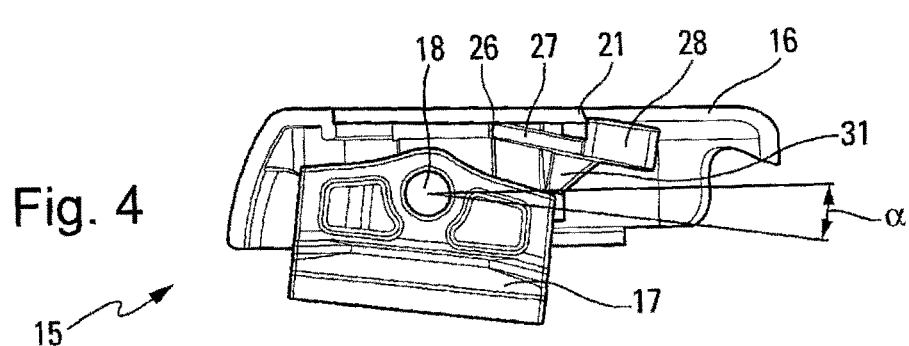

FIG. 4 illustrates the state in which the pivoting angle α between the two adapter elements 16, 17 is approximately +7° (with reference to the clockwise direction). In this position, the detent element 28 can be pressed into the mount 21 of the wiper arm 2 to an extent such that the detent element 28 is still just arranged in an operative connection with the mount 21 and therefore detaching of the wiper blade 10 from the wiper arm 2 is likewise still prevented. In this position, the underside of the stop element 31 rests in a sheet-like manner on the upper side 34 of the adapter element 17 on the wiper-blade side.

Figure 5:
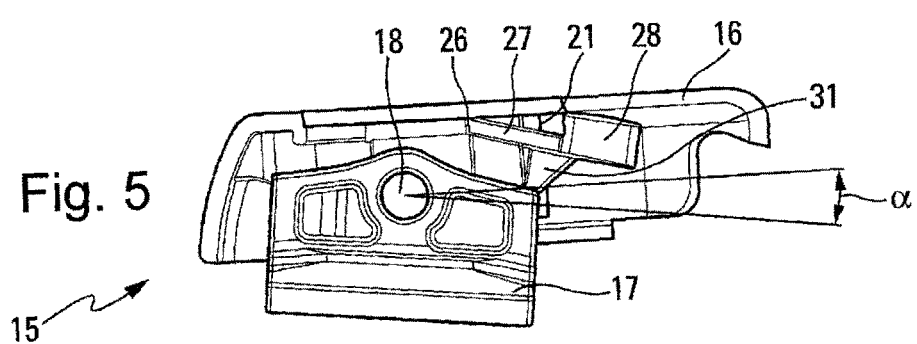

FIG. 5 illustrates the state in which the pivoting angle α between the two adapter elements 16, 17 is approximately +9°. As explained above, such a pivoting angle between the two adapter elements 16, 17 is not reached during the normal wiping operation, in which the wiper blade 10 abuts on the vehicle window 1. In this position, the wiper blade 10 can be removed from the wiper arm 2 although the underside of the stop element 31 rests in a sheet-like manner on the upper side 34 of the adapter element 17 on the wiper-blade side, wherein such a large pivoting angle α typically arises if, in order to remove the wiper blade 10 from the wiper arm 2, the wiper arm 2 is pivoted away from the vehicle window 1 and the wiper blade 10 is arranged in a freely suspended manner, as it were, from the vehicle window 1. Such free moveability of the detent element 28 in the mount 21 is likewise achieved if the pivoting angle α is not formed in the clockwise direction, as illustrated in FIGS. 3 to 5, but rather in the other direction, i.e. in the anticlockwise direction. This state which is illustrated in FIG. 6 shows that, in such an angular position, the stop element 31 does not obstruct an actuation of the detent element 28 in the direction of the arrow 35, since the stop element 31 abuts on a side surface 36 of the adapter element 17 on the wiper-blade side.

The wiper blade 10 described to this extent can be modified in diverse ways without departing from the inventive concept.

DESIGNATIONS

1 Vehicle window
2 Wiper arm
3 Wiper arm joint
10 Wiper blade
11 Wiper blade body
12 Wiper lip
15 Wiper blade adapter
16 First adapter element
17 Second adapter element
18 Pivot axis
19 Receiving region
21 Mount
22 Holding section
23 Double arrow
25 First holding arrangement
26 Pivot axis
27 Flexible tongue
28 Detent element
30 Second holding arrangement
31 Stop element
32 Stop rib
33 Stop surface
34 Upper side
35 Arrow
36 Side surface
100 Wiper device
α Pivoting angle

The invention claimed is:
1. A wiper blade for the cleaning of vehicle windows, comprising:
a wiper blade body, which is connected with a wiper arm by a wiper blade adapter, wherein the wiper blade adapter consists of a first adapter element and a second adapter element, which are arranged pivotably with respect to one another in an axis,
wherein on the first adapter element a first holding arrangement is arranged for securing the wiper blade body in the longitudinal direction of the wiper blade with a flexible tongue, and with a detent element arranged on the flexible tongue for form-fitting arrangement in a mount of the wiper arm, and with a second holding arrangement, which maintains the first holding arrangement in engagement with the mount dependent on a pivoting angle between the two adapter elements,
wherein the second holding arrangement is arranged in operative connection with the first holding arrangement and is constructed such that an actuation of the first holding arrangement is enabled as a function of the pivoting angle between the two adapter elements.

2. The wiper blade according to claim 1, wherein the second holding arrangement is constructed such that an actuation of the first holding arrangement is only enabled starting from a pivoting angle which is greater than the pivoting angles which are present during the wiping operation, which are defined by the abutting of the wiper blade body on a vehicle window, wherein the pivoting angle occurring during the wiping operation is less than 5°.

3. The wiper blade according to claim 1, wherein the second holding arrangement is directly connected with the first holding arrangement and with a pivoting angle, which is within the pivoting angles during the wiping operation, on actuation of the first holding arrangement arrives into abutting contact with the second adapter element, such that the actuation path of the first holding arrangement is delimited, so that the wiper blade body is secured on the wiper arm.

4. The wiper blade according to claim 3, wherein the second holding arrangement comprises a stop element formed on the first holding arrangement, which stop element cooperates with a stop surface on the second adapter element.

5. The wiper blade according to claim 4, wherein the stop surface is an upper side of the second adapter element.

6. The wiper blade according to claim 4, wherein the stop element is formed on the underside, facing the second adapter element, on the flexible tongue of the first holding arrangement.

7. The wiper blade according to claim 6, wherein the stop element is arranged on the side facing away from the pivot axis of the flexible tongue at least close to the detent element.

8. The wiper blade according to claim 3, wherein on exceeding the pivoting angle which is present during the wiping operation, the second holding arrangement can arrive into operative connection with the upper side or with a side surface of the second adapter element, wherein the first holding arrangement is freed.

9. The wiper blade according to claim 1, wherein the detent element is arranged on the upper side of the first adapter element facing away from the wiper blade body.

10. A wiper device, comprising:
a wiper blade according to claim 1; and
a wiper arm,
wherein the wiper arm has a mount in the form of an aperture, for the form-fitting mounting of a first holding arrangement of the wiper blade, which is arranged on the upper side of the wiper arm facing away from a vehicle window.

\* \* \* \* \*